(12) United States Patent
Tseng et al.

(10) Patent No.: US 9,128,342 B2
(45) Date of Patent: Sep. 8, 2015

(54) METHOD OF MANUFACTURING LIQUID CRYSTAL DISPLAY PANEL

(75) Inventors: Te-Jen Tseng, Hsin-Chu (TW); Cheng-Yeh Tsai, Hsin-Chu (TW); Fang-Cheng Yu, Hsin-Chu (TW); Tai-Hsiang Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 467 days.

(21) Appl. No.: 13/539,510

(22) Filed: Jul. 2, 2012

(65) Prior Publication Data

US 2013/0078884 A1   Mar. 28, 2013

(30) Foreign Application Priority Data

Sep. 28, 2011 (TW) .............................. 100135023 A (51) Int. Cl.
*G02F 1/137* (2006.01)

(52) U.S. Cl.
CPC ...... *G02F 1/137* (2013.01); *G02F 2001/13793* (2013.01)

(58) Field of Classification Search
CPC ........................ G02F 1/137; G02F 2001/13793
USPC ............................................................ 445/24
See application file for complete search history.

(56) References Cited

U.S. PATENT DOCUMENTS

| | | | | |
|---|---|---|---|---|
| 5,706,064 | A * | 1/1998 | Fukunaga et al. | 349/43 |
| 6,894,742 | B2 * | 5/2005 | Inoue et al. | 349/93 |
| 2003/0218712 | A1 * | 11/2003 | Kumar et al. | 349/155 |
| 2006/0001818 | A1 | 1/2006 | Hsu | |
| 2008/0259254 | A1 | 10/2008 | Kikuchi | |
| 2012/0001881 | A1 * | 1/2012 | Miyake et al. | 345/209 |

FOREIGN PATENT DOCUMENTS

| | | |
|---|---|---|
| TW | 594144 | 6/2004 |
| TW | 200600880 | 1/2006 |
| TW | 200600938 | 1/2006 |
| TW | I307437 | 3/2009 |
| TW | 201022414 | 6/2010 |

OTHER PUBLICATIONS

Young-Cheol Yang et al., "Electro-optic Kerr effect in polymer-stabilized isotropic liquid crystals", Applied Physics Letters 98, No. 023502, Jan. 13, 2011.

* cited by examiner

*Primary Examiner* — Thomas A Hollweg
*Assistant Examiner* — Christopher Raabe
(74) *Attorney, Agent, or Firm* — Winston Hsu; Scott Margo (57) ABSTRACT

The present invention provides a method of manufacturing a liquid crystal display panel. First, a top substrate, a bottom substrate, and a liquid crystal medium are provided, and the liquid crystal medium is filled between the top substrate and the bottom substrate. Next, an electric field is applied to the liquid crystal medium. Then, the electric field is stopped. Thereafter, an energy light beam is irradiated on the liquid crystal medium to form a liquid crystal layer.

13 Claims, 11 Drawing Sheets

METHOD OF MANUFACTURING LIQUID CRYSTAL DISPLAY PANEL

BACKGROUND OF THE INVENTION

1. Field of the Invention

The present invention relates to a method of manufacturing a liquid crystal display (LCD) panel, and more particularly, to a method of manufacturing an LCD panel having blue-phase liquid crystals.

2. Description of the Prior Art

The advantages of a liquid crystal display (LCD) panel include the portability, low power consumption, and low radiation. Therefore, the LCD panel is widely used in various portable products, such as notebooks, personal data assistants (PDA), etc. Moreover, the LCD panel replaces the CRT monitor in desktop computers gradually. Traditional LCD panel utilizes the liquid crystal molecules having optical anisotropic property to drive liquid crystal molecules to have various arrangements by an electric field, and in combination with the polarizer, the LCD panel could display a bright state and a dark state. Generally, a response time of the traditional LCD panel utilizing the liquid crystal molecules having optical anisotropic property requires 10 milliseconds or more.

For solving the response time of the liquid crystal molecules being too long, the LCD panel utilizing blue-phase liquid crystals has been developed. The blue phase is a liquid crystal state between an isotropic state and a cholesteric phase state, and is an unstable lattice state. Furthermore, the blue-phase liquid crystals not only have a characteristic of a three dimensional lattice, but also have a characteristic of fluid, so that the lattice constant of the blue-phase liquid crystals is easily changed, and the blue-phase liquid crystals have fast response time. Since the temperature range of the blue-phase liquid crystals is very narrow, the LCD panel utilizing the blue-phase liquid crystals according to the prior art adds reactive monomer into the blue-phase liquid crystals and polymerizing the reactive monomer to stabilize the liquid crystal state of the blue-phase liquid crystals by illuminating light. Accordingly, the temperature range of operating the blue-phase liquid crystals could be increased.

However, a percentage of the reactive monomers added into the blue-phase liquid crystals should be ten percentages of the blue-phase liquid crystal to increase the temperature range of blue-phase liquid crystals, so that a driving voltage of the blue-phase liquid crystals would be increased, and the rotation of the blue-phase liquid crystals is affected. In addition, the blue-phase liquid crystals recovering from an optical anisotropic state to an optical isotropic state have no driving voltage. Thus, when the driving voltage is increased, a lattice deformation of the blue-phase liquid crystals is larger, and the blue-phase liquid crystals require longer time to recover. Accordingly, the falling time of the blue-phase liquid crystals would be increased with the increase of the driving voltage, and do not fit the requirement.

Therefore, to reduce the response time of the blue-phase liquid crystals under the condition without increasing the driving voltage is an objective in this field.

SUMMARY OF THE INVENTION

It is one of the objectives of the claimed invention to provide a method of manufacturing an LCD panel to reduce the response time of the blue-phase liquid crystals under the condition without increasing the driving voltage.

According to one embodiment, a method of manufacturing an LCD panel provided. First, a top substrate, a bottom substrate, and a liquid crystal medium are provided, wherein the liquid crystal medium being filled between the top substrate and the bottom substrate. Next, an electric field is applied to the liquid crystal medium. Then, the electric field is stopped applying. Subsequently, an energy light beam is irradiated on the liquid crystal medium to form a liquid crystal layer.

The method of manufacturing the LCD panel in the present invention is to apply electric field on the liquid crystal medium first before irradiating the energy light beam, so that the falling time of the manufactured LCD panel could be effectively reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
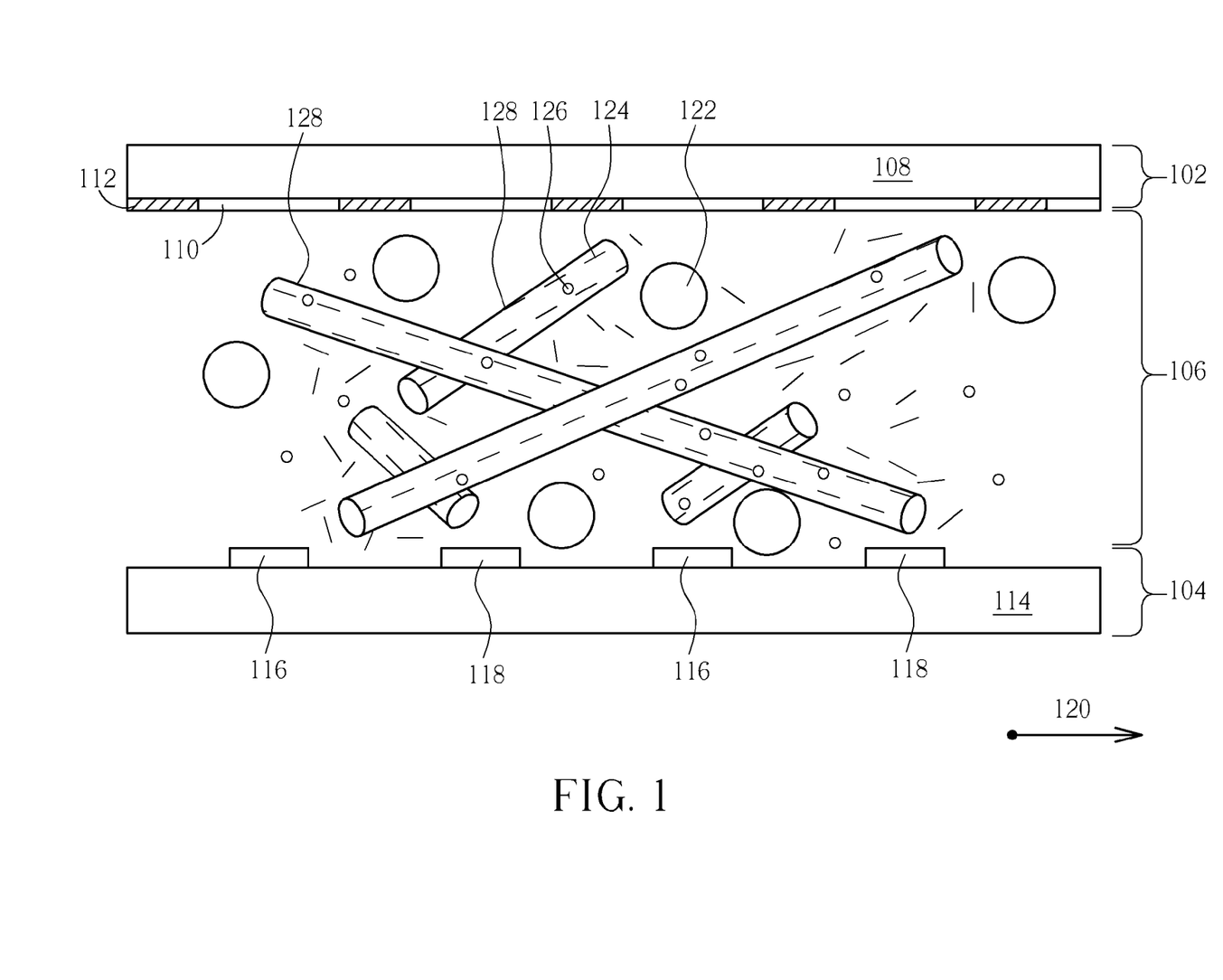
FIG. 1 through FIG. 3 are schematic diagrams illustrating a method of manufacturing an LCD panel according to a first preferred embodiment of the present invention.
Figure 2:
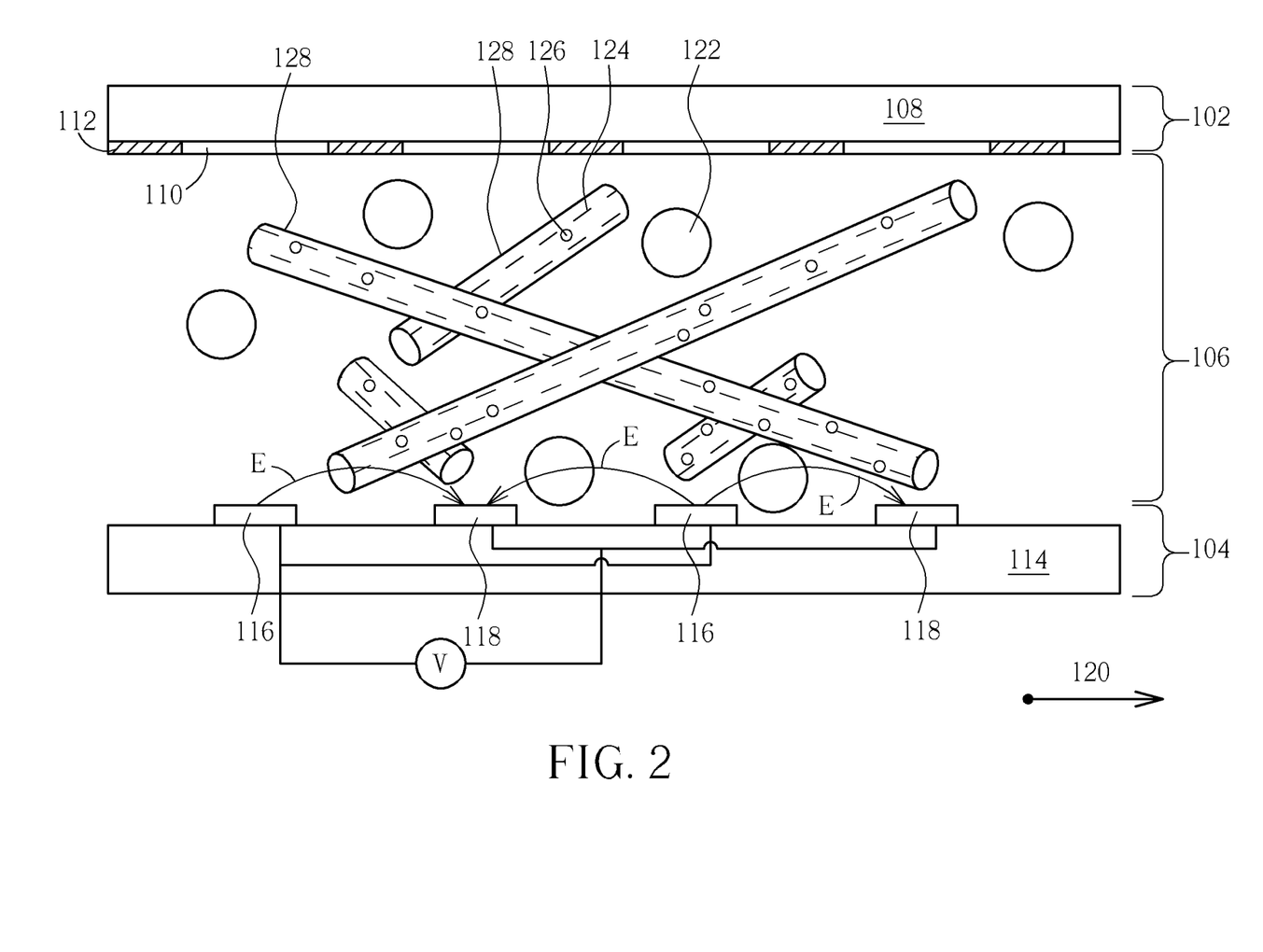
Figure 3:
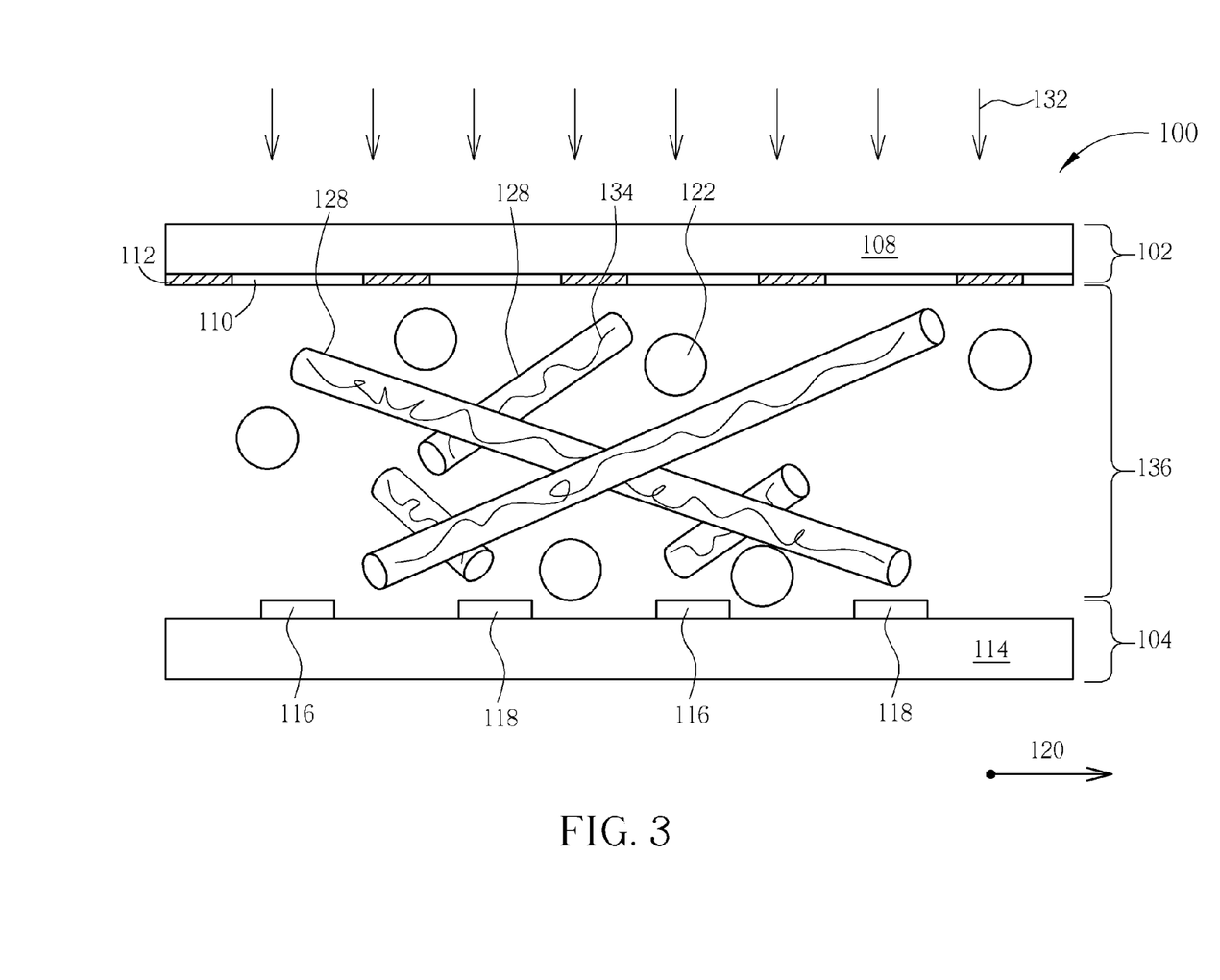

Refer to FIG. 1 through FIG. 3, which are schematic diagrams illustrating a method of manufacturing an LCD panel according to a first preferred embodiment of the present invention. As shown in FIG. 3, a top substrate 102, a bottom substrate 104 and a liquid crystal medium 106 are provided first, and the liquid crystal medium 106 is filled between the top substrate 102 and the bottom substrate 104. In this embodiment, the top substrate 102 is a color filter substrate, and the bottom substrate 104 is a thin-film-transistor array substrate. Furthermore, the top substrate 102 includes a first substrate 108, a color filter layer 110, and a black matrix 112, and the color filter layer 110 and the black matrix 112 are disposed between the first substrate 108 and the liquid crystal medium 106. The step of providing the top substrate 102 includes providing the first substrate 108 and forming the color filter layer 110 and the black matrix 112 on the first substrate 108. The present invention is not limited thereto. Furthermore, the bottom substrate 104 includes a second substrate 114, a plurality of pixel electrodes 116, and a plurality of common electrodes 118. The pixel electrodes 116 and the common electrodes 118 are disposed between the liquid crystal medium 106 and the second substrate 114, and each pixel electrode 116 and the each common electrode 118 are arranged alternatively and sequentially along a direction 120. The step of providing the bottom substrate 104 includes providing the second substrate 114, forming the pixel electrodes 116 on the second substrate 114, and forming the common electrodes 118 on the second substrate 114. In this embodiment, the pixel electrodes 116 and the common electrodes could be constituted by a same transparent conductive layer, and formed simultaneously in a same step. The present invention is not limited thereto. In addition, before the step of forming the pixel electrodes 116 and the common electrodes 118, the step of providing the bottom substrate 104 could further include forming thin-film transistors and related circuit structure, such as a plurality of scan lines, a gate insulating layer, a channel layer, a plurality of data lines, a plurality of drain electrodes, and a passivation layer, and the thin-film transistors and the related circuit structure are disposed between the liquid crystal medium 106 and the second substrate 114. Accordingly, the LCD panel of this embodiment is an in-plane switching LCD panel. The pixel electrodes and the common electrodes of the present invention is not limited to be formed by the same transparent conductive layer, and the arrangements of the pixel electrodes and the common electrodes are not limited to the above-mentioned description.

In the other embodiments of the present invention, the LCD panel could further include an insulating layer disposed between the pixel electrodes and the common electrodes, and the common electrodes are disposed between the pixel electrodes and the bottom substrate or the pixel electrodes are disposed between the common electrodes and the bottom substrate. Or, the common electrodes could further cover the bottom substrate, but the present invention is not limited thereto. Furthermore, the color filter layer of the present invention is not limited to be disposed in the top substrate, and also could be disposed in the bottom substrate. The numbers of the pixel electrode and the common electrode could also be only one.

In this embodiment, the liquid crystal medium 106 includes a plurality of liquid crystal molecules 122, a plurality of reactive monomers 124, and a plurality of photo initiators 126. The step of providing the liquid crystal medium 106 includes providing the liquid crystal molecules 122, providing the reactive monomers 124, providing the photo initiators 126, and mixing the liquid crystal molecules 122, the reactive monomers 124 and the photo initiators 126. When no driving electric field is applied to the liquid crystal medium 106, the liquid crystal medium 106 has an optical isotropic property, and the LCD panel could display a dark state. When a driving electric field is applied to the liquid crystal medium 106, the liquid crystal medium 106 has an optical anisotropic property, and the LCD panel could display a bright state.

As shown in FIG. 2, after filling the liquid crystal medium 106 between the top substrate 102 and the bottom substrate 104, the liquid crystal medium 106 is disposed in a specific temperature range, such as 10° C. to 40° C., and the liquid crystal medium 106 could become blue-phase liquid crystals. Next, a voltage difference V is provided between each pixel electrode 116 and each common electrode 118 to generate an electric field E between each pixel electrode 116 and each common electrode 118, and the electric field E is applied on the liquid crystal medium 106 that becomes the blue-phase liquid crystals. Accordingly, the liquid crystal molecules 122 are driven by the electric field E to have the optical anisotropic property, and are tilted to a predetermined position that is an arrangement direction of each liquid crystal molecule 122 when the LCD panel displays the bright state. Furthermore, the liquid crystal molecules 122 have a plurality of defect spaces 128 disposed among them. In this embodiment, the range of the voltage difference V is larger than 0 volt and less than or equal to a saturation voltage of the liquid crystal medium 106. The saturation voltage represents a smallest driving voltage, such as 65 volts, to form the liquid crystal layer to the highest transmittance in the following step. The present invention is not limited thereto, and the smallest driving voltage could be adjusted according to different kinds of liquid crystal molecules. In addition, the specific temperature range of the present invention is not limited to the above-mentioned range, and could be determined according to temperature ranges of different kinds of the liquid crystal medium becoming the blue-phase liquid crystals.

Figure 4:
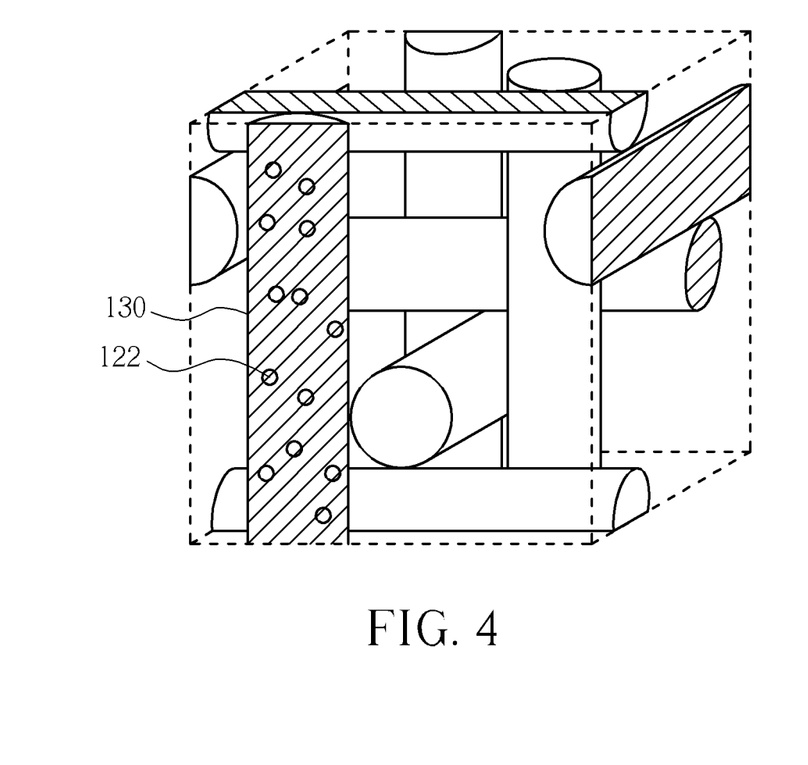
FIG. 4 is a schematic diagram illustrating a lattice structure of first blue-phase liquid crystals according to the present invention.
Figure 5:
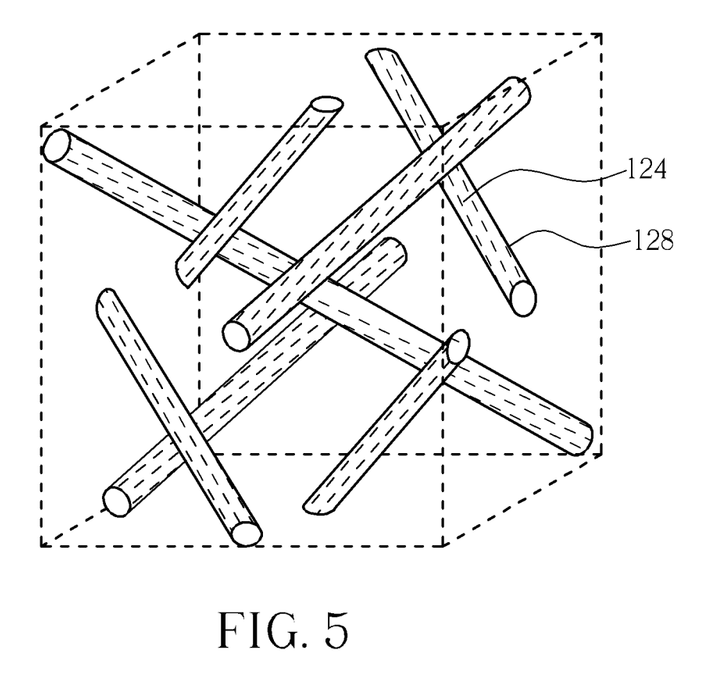
FIG. 5 is a schematic diagram illustrating disclination lines of the first blue-phase liquid crystals according to the present invention.
Figure 6:
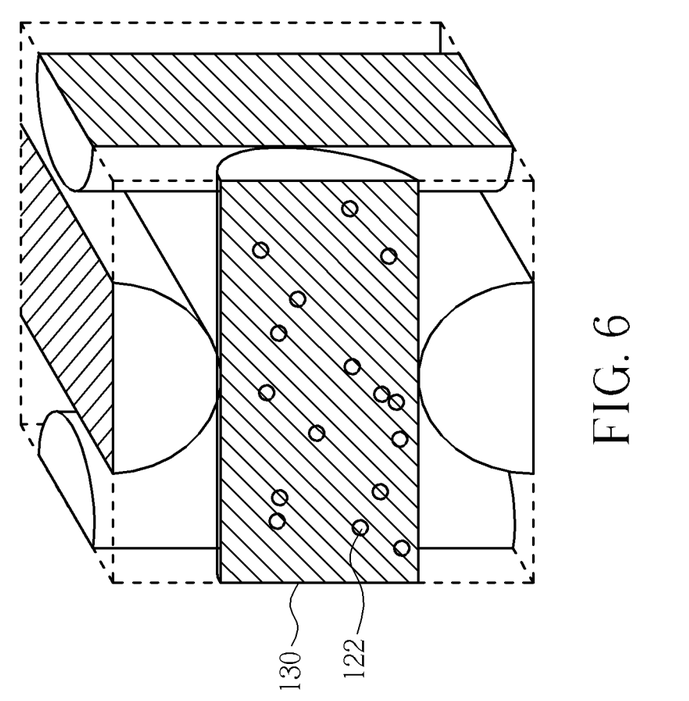
FIG. 6 is a schematic diagram illustrating a lattice structure of second blue-phase liquid crystals according to the present invention.
Figure 7:
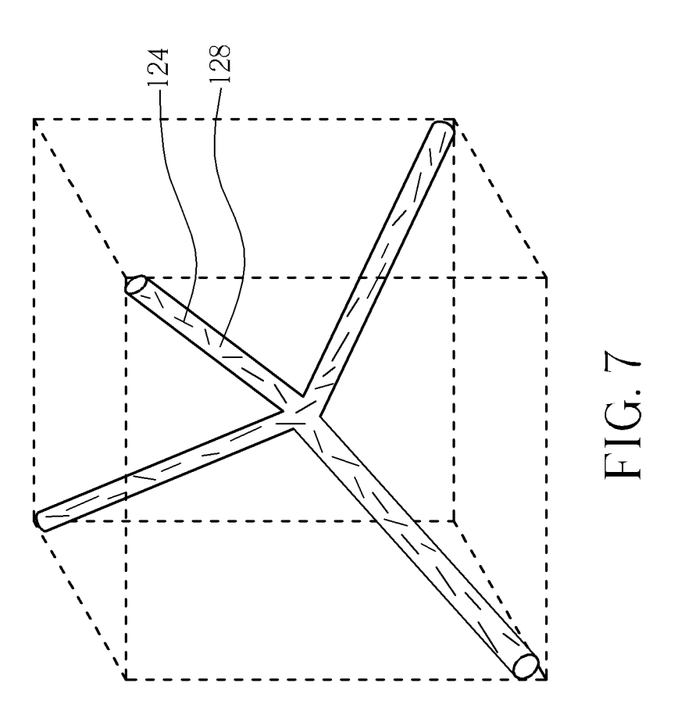
FIG. 7 is a schematic diagram illustrating disclination lines of the second blue-phase liquid crystals according to the present invention.

In this embodiment, the blue phase is first blue phase (BP I), but the present invention is not limited herein. The blue phase of the present invention could be second blue phase (BP II). The lattice structure and the defect spaces of the blue-phase liquid crystals are described in the following description. Refer to FIG. 4 through FIG. 7. FIG. 4 is a schematic diagram illustrating a lattice structure of first blue-phase liquid crystals according to the present invention, and FIG. 5 is a schematic diagram illustrating disclination lines of the first blue-phase liquid crystals according to the present invention. FIG. 6 is a schematic diagram illustrating a lattice structure of second blue-phase liquid crystals according to the present invention, and FIG. 7 is a schematic diagram illustrating disclination lines of the second blue-phase liquid crystals according to the present invention. As shown in FIG. 4, the liquid crystal molecules 122 constitute a plurality of twist cylinder structure 130, so that the first blue-phase liquid crystals could be a body-centered cubic (BCC) structure constituted by utilizing a double twist cylinder (DTC) structure as a basic unit. Accordingly, the liquid crystal molecules 122 could be arranged in a way of having smallest free energy, and the twist cylinder structures 130 of the double twist cylinder structure are perpendicular to each other. As shown in FIG. 5, the first blue-phase liquid crystals are not fully filled in the space between the top substrate 102 and the bottom substrate 104 due to having the BCC structure. Thus, the twist cylinder structures 130 constituted by the liquid crystal molecules 122 have the defect spaces 128 without filling the liquid crystal molecules 122 among them, and the defect spaces 128 are the disclination lines. Similarly, as shown in FIG. 6 and FIG. 7, the second blue-phase liquid crystals also utilizes the DTC structure as a basic unit to form a simple cubic (SC) structure. The second blue-phase liquid crystals also have the defect spaces 128 without filling the liquid crystal molecules 122 due to having the SC structure. It should be noted that since the liquid crystal molecules 122 and the reactive monomer 126 do not melt each other, when the liquid crystal molecules 122 is tilted to the predetermined position, the liquid crystal molecules 122 still have the defect spaces 128, and the reactive monomers 126 are pushed to the defect spaces 128 among the liquid crystal molecules 122 to fill the defect spaces 128.

As shown in FIG. 3, the electric field E is subsequently stopped applying to the liquid crystal medium 106. Then, an energy light beam, such as an ultraviolet light, is irradiated on the liquid crystal medium 106 under the condition that the liquid crystal medium 106 is still controlled in the specific temperature range, and the reactive monomers 124 are polymerized to polymers 134 to form a liquid crystal layer 136.

The liquid crystal layer 136 is constituted by polymer stabilized blue-phase liquid crystals. The LCD panel 100 of this embodiment is completed. The wavelength and the strength of the energy light beam in the present invention could be adjusted according to different kinds of reactive monomers and photo initiators.

It should be noted that since the liquid crystal molecules 122 are driven to be tilted to the predetermined position that is the arrangement state of the liquid crystal molecules 122 being driven to display the bright state before irradiating the energy light beam 132, the defect spaces 128 filled by the reactive monomers 124 is the spaces among the liquid crystal molecules 122 when the liquid crystal medium 106 has the optical anisotropic property, and the formed polymers 134 are disposed in the defect spaces 128 when the liquid crystal medium 106 has the optical anisotropic property. Accordingly, the optoelectronic characteristic of the liquid crystal layer 136 could be changed, and the response time of the manufactured LCD panel 100 could be effectively shortened. Especially, when the liquid crystal layer 136 is changed from the bright state to the dark state, the falling time of the LCD panel 100 could be effectively shortened due to the change of the optoelectronic characteristic of the liquid crystal layer 136.

Figure 8:
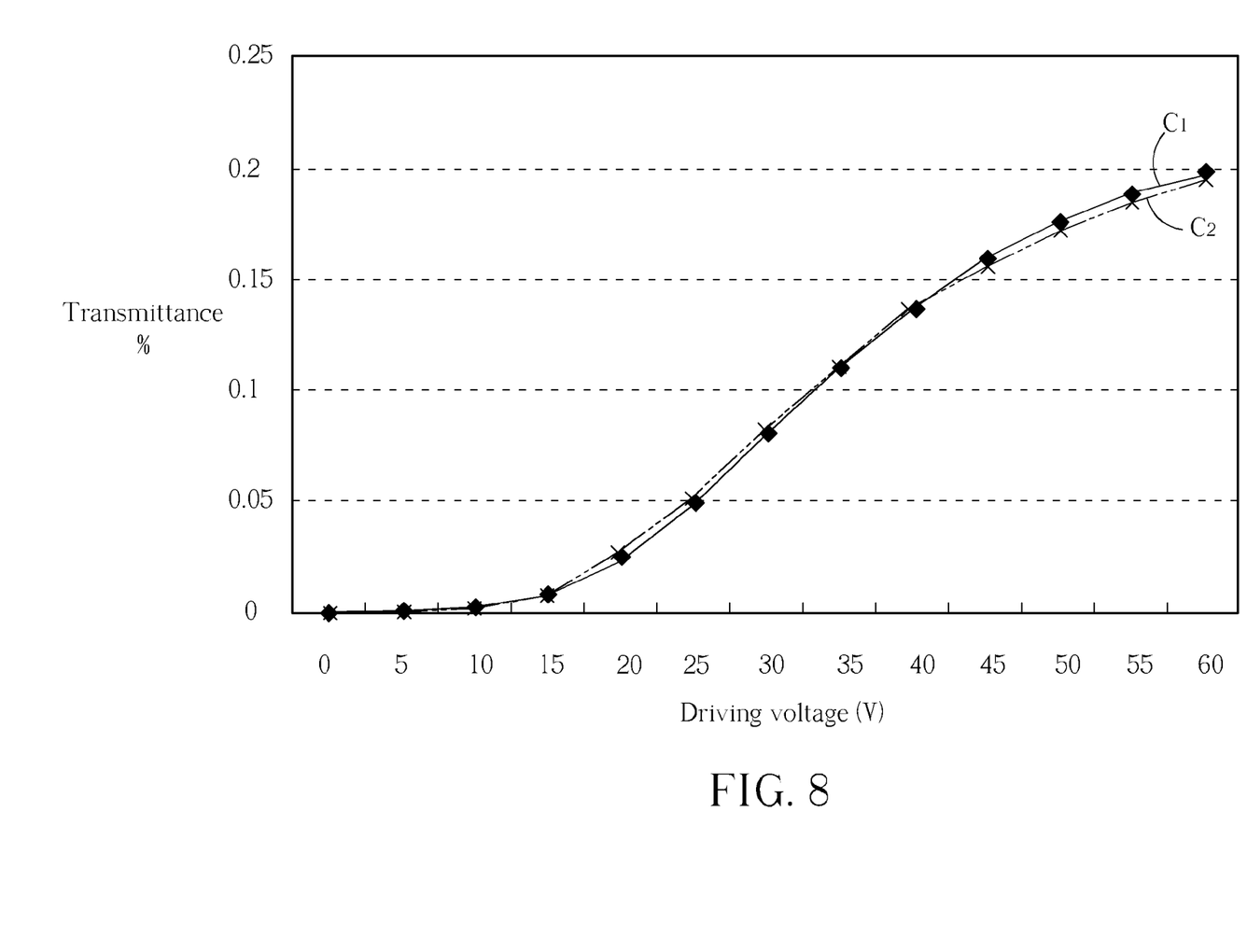
FIG. 8 is a schematic diagram illustrating relationships between the transmittances and the driving voltages of the LCD panels.
Figure 9:
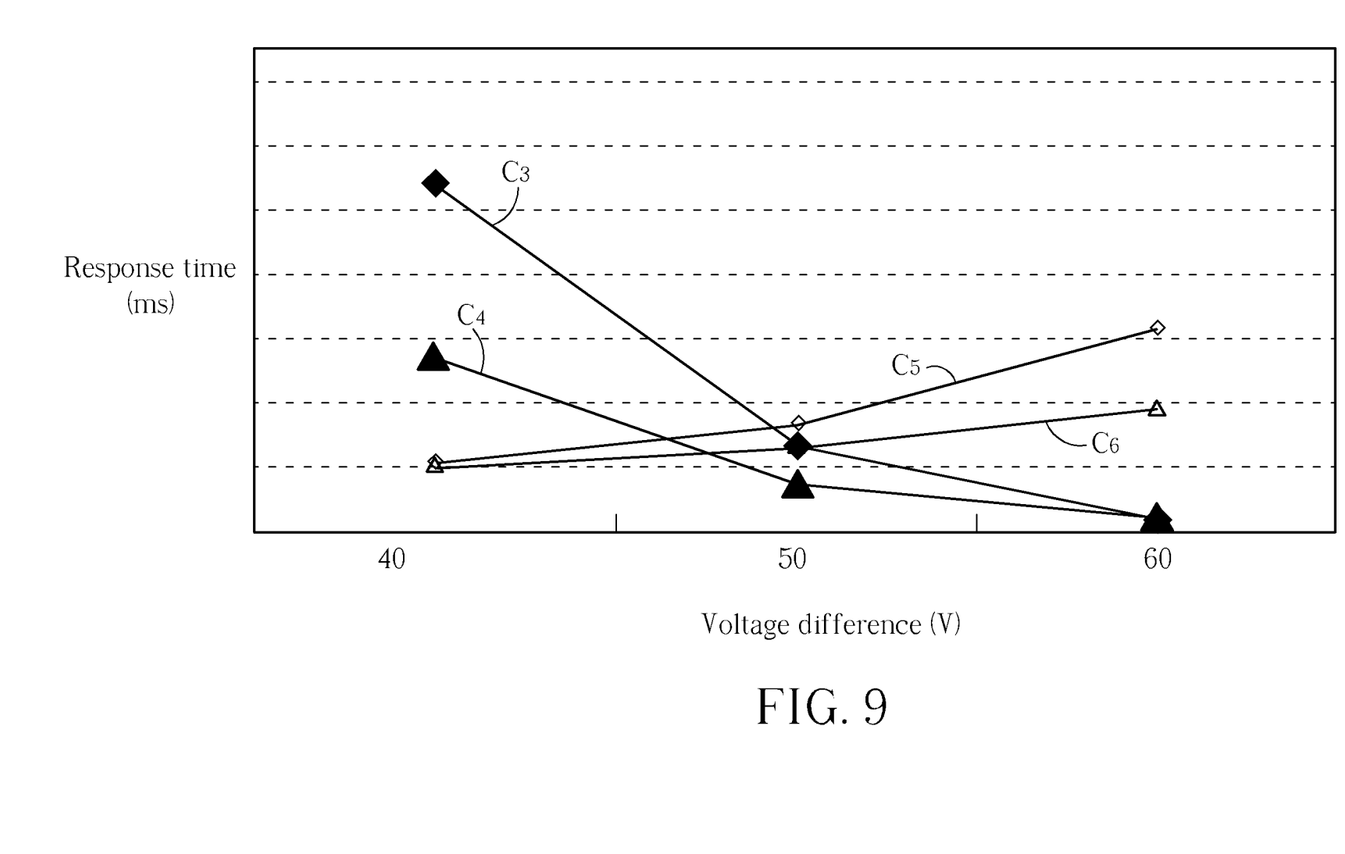
FIG. 9 is a schematic diagram illustrating relationships between the driving voltages and the response times of the LCD panel when the LCD panel is turned on and turned off.

The following description further compare the LCD panel manufactured by the manufacturing method in this embodiment with an LCD panel manufactured by a method without applying the electric field to the liquid crystal medium before irradiating the energy light beam. Refer to FIG. 8 and FIG. 9. FIG. 8 is a schematic diagram illustrating relationships between the transmittances and the driving voltages of the LCD panels. FIG. 9 is a schematic diagram illustrating relationships between the driving voltages and the response times of the LCD panel when the LCD panel is turned on and turned off. As shown in FIG. 8, a first curve $C_1$ represents a relationship curve of the LCD panel manufactured the method without applying the electric field to the liquid crystal medium before irradiating the energy light beam, and a second curve $C_2$ represents a relationship curve of the LCD panel manufactured by the manufacturing method of this embodiment. Since the first curve $C_1$ and the second curve $C_2$ are substantially the same, in the same driving voltage, the LCD panel manufactured by the manufacturing method of this embodiment could have the same transmittance as the LCD panel manufactured the method without applying the electric field to the liquid crystal medium before irradiating the energy light beam. As shown in FIG. 9, a third curve $C_3$ represents a relationship curve between a rising time and a driving voltage of the LCD panel manufactured the method without applying the electric field to the liquid crystal medium before irradiating the energy light beam, and a fourth curve $C_4$ represents a relationship curve between a rising time and a driving voltage of the LCD panel manufactured by the manufacturing method of this embodiment. The rising time is a time of applying the electric field to the liquid crystal molecules to display the bright state. As we could see from the third curve $C_3$ and the fourth curve $C_4$, when the driving voltage is less than the saturation voltage, such as 40 volts, the rising time of the LCD panel manufactured by the manufacturing method of this embodiment is less than the rising time of the LCD panel manufactured the method without applying the electric field to the liquid crystal medium before irradiating the energy light beam. When the driving voltage is substantially the same as the saturation voltage, the rising times of the LCD panel manufactured by the manufacturing method of this embodiment and the LCD panel manufactured the method without applying the electric field to the liquid crystal medium before irradiating the energy light beam are substantially the same. Thus, the method in this embodiment could effectively reduce the rising time when the driving voltage is less than the saturation voltage, and the transmittance is not changed. Furthermore, a fifth curve $C_5$ represents a relationship curve between a falling time and the driving voltage of the LCD panel manufactured the method without applying the electric field to the liquid crystal medium before irradiating the energy light beam, and a sixth curve $C_6$ represents a relationship curve between a falling time and the driving voltage of the LCD panel manufactured by the manufacturing method of this embodiment. The falling time is a time of turning off the electric field applied to the liquid crystal molecules to display the dark state. As we could see from the fifth curve $C_5$ and the sixth curve $C_6$, when the driving voltage is substantially the same as the saturation voltage, the falling time of the LCD panel manufactured by the manufacturing method of this embodiment is less than the falling time of the LCD panel manufactured the method without applying the electric field to the liquid crystal medium before irradiating the energy light beam. when the driving voltage is less than the saturation voltage, such as 40 volts, the falling times of the LCD panel manufactured by the manufacturing method of this embodiment and the LCD panel manufactured the method without applying the electric field to the liquid crystal medium before irradiating the energy light beam are substantially the same. Thus, the method in this embodiment could further effectively reduce the falling time when the driving voltage is the same as the saturation voltage, and the transmittance is not changed. It should be noted that in order to have best contrast ratio, the driving voltage and the saturation voltage of the LCD panel are preferably the same, and the falling time of the LCD panel manufactured by the manufacturing method of this embodiment could be effectively reduced.

Figure 10:
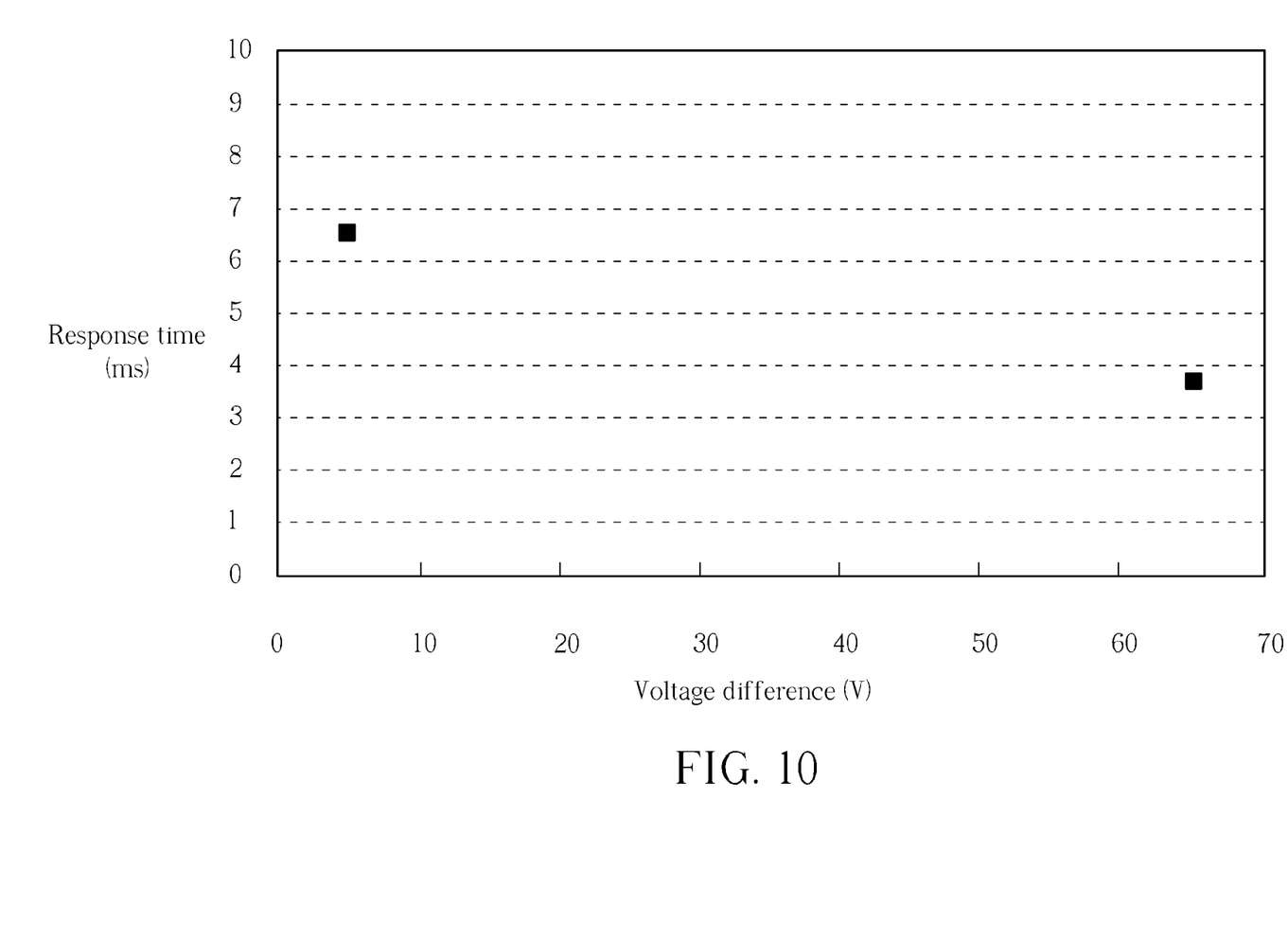
FIG. 10 is a schematic diagram illustrating a voltage difference and a response time provided before the step of irradiating the energy light beam.

Refer to FIG. 10, which is a schematic diagram illustrating a voltage difference and a response time provided before the step of irradiating the energy light beam. As shown in FIG. 10, when the provided voltage difference is 5 volts, the falling time of the manufactured LCD panel is substantially 6.5 microseconds. When the provided voltage difference is the same as the saturation voltage, the falling time of the manufactured LCD panel is substantially 3.7 microseconds. Accordingly, when the provided voltage difference is close to the saturation voltage, the falling time of the manufactured LCD panel is shorter. Thus, the provided voltage difference is preferably the same as the saturation voltage.

The method of manufacturing the LCD panel of the present invention is not limited to the above-mentioned embodiment. The following description continues to detail the other embodiments or modifications, and in order to simplify and show the difference between the other embodiments or modifications and the above-mentioned embodiment, the same numerals denote the same components in the following description, and the same parts are not detailed redundantly.

Figure 11:
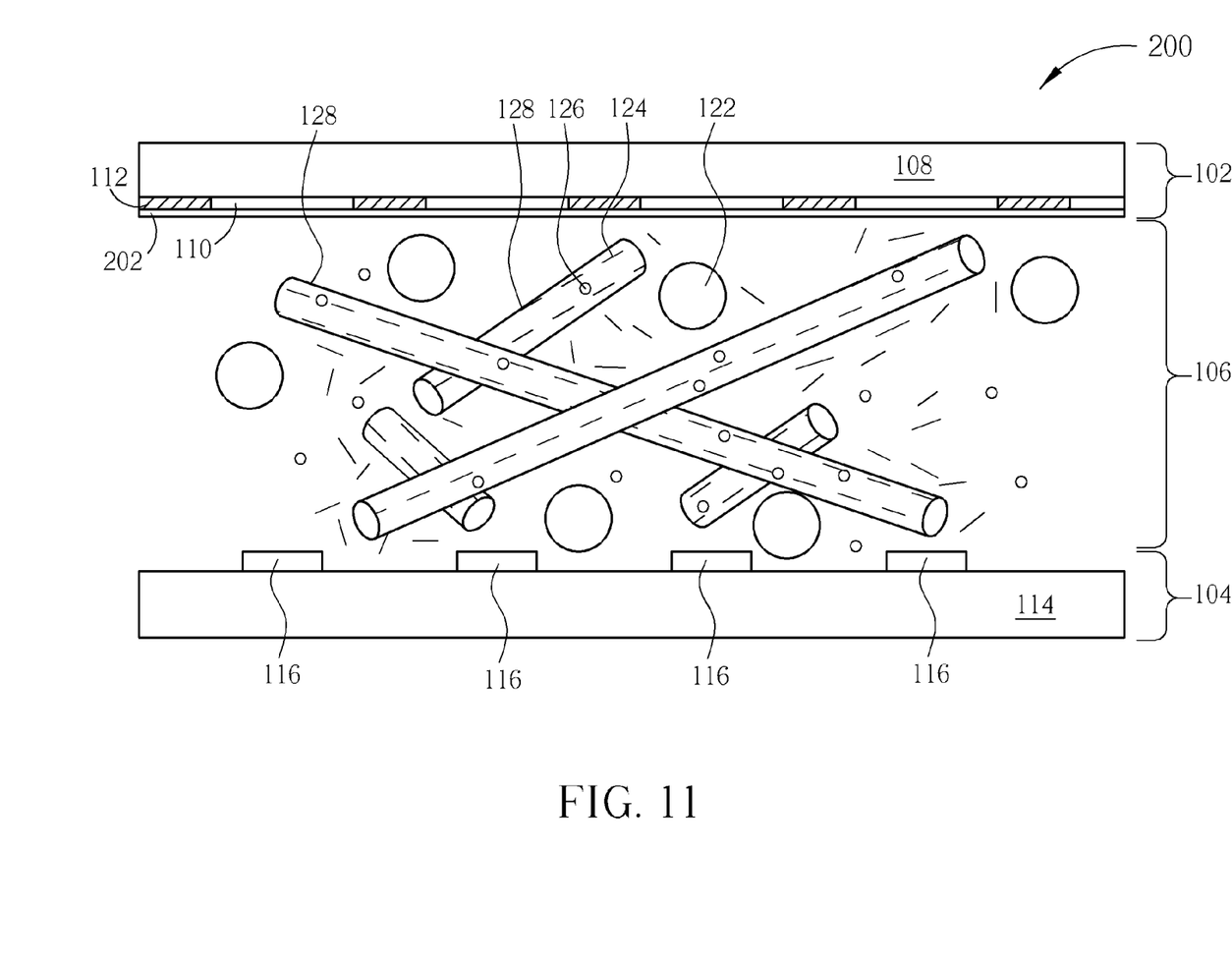
FIG. 11 is a schematic diagram illustrating a method of manufacturing an LCD panel according to a second preferred embodiment of the present invention.

Refer to FIG. 11, which is a schematic diagram illustrating a method of manufacturing a LCD panel according to a second preferred embodiment of the present invention. As shown in FIG. 11, as compared with the first embodiment, the LCD panel 200 in this embodiment is a vertical aligned LCD panel. In this embodiment, the top substrate 102 further includes a common electrode 202 disposed between the liquid crystal medium 106 and the first substrate 108 besides including the first substrate 108, the color filter layer 110 and the black matrix 112. In addition, the step of providing the top substrate includes providing the first substrate 108, forming the color filter layer 110 and the black matrix 112 on the first substrate 108, and forming the common electrode 202 on the first substrate 108. Furthermore, the top substrate 104 does not include the common electrode, and includes the second substrate 114, the pixel electrode 116, and the thin-film transistor and the related circuit structure. The step of providing the bottom substrate 104 includes providing the second substrate 114, and forming the pixel electrode 116 on the second substrate 114. A difference between the method of the following step after the step of providing the top substrate 102, the bottom substrate 104 and the liquid crystal medium 106 in this embodiment and the method in first embodiment is the common electrode 202 being disposed on the top substrate 102, so that the electric field generated from the voltage difference provided between the common electrode 202 and the pixel electrode 116 is perpendicular to the top substrate 102 and the bottom substrate 104. The same parts are not detailed redundantly.

In summary, the method of manufacturing LCD panel in the present invention is to apply electric field on the liquid crystal medium first before irradiating the energy light beam, so that the liquid crystal molecules are tilted to the predetermined position, and the reactive monomers are pushed into the defect spaces. Accordingly, the formed polymers are disposed in the defect spaces when the liquid crystal medium has the optical anisotropic property, and the falling time of the manufactured LCD panel could be effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of manufacturing a liquid crystal display (LCD), comprising:
    providing a top substrate, a bottom substrate, and a liquid crystal medium, wherein the liquid crystal medium being filled between the top substrate and the bottom substrate;
    applying an electric field to the liquid crystal medium;
    stopping applying the electric field; and
    irradiating an energy light beam on the liquid crystal medium to form a liquid crystal layer after stopping applying the electric field, wherein there is no energy light beam irradiated on the liquid crystal medium before irradiating the energy light beam on the liquid crystal medium.

2. The method of manufacturing the LCD panel according to claim 1, wherein the step of applying the electric field and the step of irradiating the energy light beam comprising placing the liquid crystal medium at a temperature range.

3. The method of manufacturing the LCD panel according to claim 1, wherein the step of providing the liquid crystal medium comprises:
    providing a plurality of liquid crystal molecules, and the liquid crystal molecules have a plurality of defect spaces;
    providing a plurality of reactive monomers; and
    mixing the reactive monomers and the liquid crystal molecules.

4. The method of manufacturing the LCD panel according to claim 3, wherein in the step of applying the electric field, the reactive monomers are filled into the defect spaces.

5. The method of manufacturing the LCD panel according to claim 1, wherein in the step of providing the liquid crystal medium, when no driving electric field is applied to the liquid crystal medium, the liquid crystal medium has an optical isotropic property, and when a driving electric field is applied to the liquid crystal medium, the liquid crystal medium has an optical anisotropic property.

6. The method of manufacturing the LCD panel according to claim 1, the liquid crystal medium is blue phase liquid crystal.

7. The method of manufacturing the LCD panel according to claim 1, wherein the step of providing the bottom substrate comprising:
    providing a substrate;
    forming at least one pixel electrode on the substrate, and between the liquid crystal medium and the substrate; and
    forming at least one common electrode on the substrate, wherein the common electrode and the pixel electrode are arranged along a direction, and the common electrode is disposed between the liquid crystal medium and the substrate.

8. The method of manufacturing the LCD panel according to claim 7, wherein the step of applying the electric field comprises providing a voltage difference between the pixel electrode and the common electrode to generate the electric field.

9. The method of manufacturing the LCD panel according to claim 8, wherein the step of providing the voltage difference comprises:
    providing a range of the voltage difference being larger than 0 volt and being less than or equal to a saturation voltage of the liquid crystal medium.

10. The method of manufacturing the LCD panel according to claim 1, wherein the step of providing the top substrate and the bottom substrate comprises:
    providing a first substrate;
    forming a common electrode on the first substrate, and the common electrode being disposed between the liquid crystal medium and the first substrate;
    providing a second substrate; and
    forming at least one pixel electrode on the second substrate, and the pixel electrode being disposed between the liquid crystal medium and the second substrate.

11. The method of manufacturing the LCD panel according to claim 10, wherein the step of applying the electric field comprises providing a voltage difference between the pixel electrode and the common electrode to generate the electric field.

12. The method of manufacturing the LCD panel according to claim 11, wherein the step of providing the voltage difference comprises:
    providing a range of the voltage difference being larger than 0 volt and being less than or equal to a saturation voltage of the liquid crystal medium.

13. The method of manufacturing the LCD panel according to claim 1, wherein the step of irradiating the energy light beam on the liquid crystal medium comprises providing an ultraviolet light.

* * * * *